United States Patent
Falabella

(10) Patent No.: US 10,132,661 B2
(45) Date of Patent: Nov. 20, 2018

(54) SYSTEM AND METHOD OF DITHERING A SENSOR ASSEMBLY

(71) Applicant: LOCKHEED MARTIN CORPORATION, Bethesda, MD (US)

(72) Inventor: David J. Falabella, Merritt Island, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 175 days.

(21) Appl. No.: 15/358,057

(22) Filed: Nov. 21, 2016

(65) Prior Publication Data

US 2018/0143043 A1 May 24, 2018

(51) Int. Cl.
| | |
|---|---|
| *G01D 11/30* | (2006.01) |
| *H04N 5/232* | (2006.01) |
| *G02B 27/46* | (2006.01) |
| *G01C 9/02* | (2006.01) |

(52) U.S. Cl.
CPC ............ *G01D 11/30* (2013.01); *G01C 9/02* (2013.01); *G02B 27/46* (2013.01); *H04N 5/232* (2013.01)

(58) Field of Classification Search
CPC .......... G01D 11/30; H04N 5/232; H04N 3/10; H04N 1/40; H04N 1/028; H04N 5/357; G02B 27/46; G01C 9/02; G01J 3/28; G01J 3/02; A61B 3/10
See application file for complete search history.

(56) References Cited

U.S. PATENT DOCUMENTS

| | | | | |
|---|---|---|---|---|
| 1,847,010 | A | * | 2/1932 | Koppe ................ G03B 27/66 355/54 |
| 3,876,903 | A | | 4/1975 | Landau |
| 5,335,091 | A | | 8/1994 | Palum |
| 5,831,671 | A | * | 11/1998 | Chigira .............. G02B 27/646 348/208.8 |

(Continued)

FOREIGN PATENT DOCUMENTS

WO 2013176732 11/2013

OTHER PUBLICATIONS

PCT/US2017/061298 International Search Report, dated Feb. 13, 2018.

*Primary Examiner* — Que T Le
*Assistant Examiner* — Jennifer Bennett
(74) *Attorney, Agent, or Firm* — Terry M. Sanks, Esq.; Beusse Wolter Sanks & Maire, PLLC

(57) ABSTRACT

Embodiments include a dither system comprising a support member to support a sensor housing having a common line-of-sight (LOS). A first metal bellows is coupled to the support member and being concentric to the sensor housing to constrain rotational motion of the sensor housing and allow angular motion. An eccentric cam comprising: an outer circumference having an axis coaxial with an axis of the first bellows and an inner circumference including an axis laterally offset from the axis of the first bellow. The eccentric cam drives tilt motion of the sensor housing and LOS. A second metal bellows is coaxial to the inner circumference of the eccentric cam and being concentric to the sensor housing. A position measurement system coupled to the sensor housing tracks the tilt motion of the sensor housing with respect to the angular motion of the eccentric cam. A system and method are also provided.

20 Claims, 7 Drawing Sheets

(56) References Cited

U.S. PATENT DOCUMENTS

| | | |
|---|---|---|
| 7,791,765 B1 | 9/2010 | Hughes et al. |
| 2003/0160942 A1 | 8/2003 | Xie et al. |
| 2005/0013646 A1 | 1/2005 | Blanding |
| 2007/0197939 A1* | 8/2007 | Wallace ............... A61B 5/6885 600/587 |

* cited by examiner

SYSTEM AND METHOD OF DITHERING A SENSOR ASSEMBLY

BACKGROUND

Embodiments relate to a system and method of dithering a sensor assembly.

Known sensor dither mechanisms move part of the sensor system during dithering. These dither mechanisms do not use a precision position measurement system attached to the moving portion of the sensor system to track the sensor pointing or line-of-sight (LOS). Instead, precise and expensive position sensors are used to measure the movement of the dithered part of the sensor system relative to the fixed portion of the sensor system.

In some systems, only a single optical component in a sensor system may be dithered to improve resolution. As the resolution of optical sensors increases, it is increasingly important to be able to track the location of the dithered line-of-sight (LOS) accurately, such as, on the order of a $\frac{1}{10}$ of a pixel, by way of example. However, when tilting a portion of the sensor system, it is difficult to maintain accurate and repeatable movement of the LOS. Therefore, temperature variations and wear can be a source of error which is challenging as imaging systems seek to attain higher resolutions.

SUMMARY

Embodiments relate to a system and method of dithering a sensor assembly. An aspect of the embodiments includes a system comprising a support member to support a sensor housing which has a common line-of-sight (LOS) therethrough. A first metal bellows is coupled to the support member and is concentric to the sensor housing to constrain rotational motion of the sensor housing and allow angular motion. The system includes an eccentric cam comprising: an outer circumference which has an axis that is coaxial with an axis of the first metal bellows and an inner circumference including an axis which is laterally offset from the axis of the first bellow. The eccentric cam drives tilt motion of the sensor housing and LOS. A second metal bellows is coaxial to the inner circumference of the eccentric cam and is concentric to the sensor housing. The system includes a position measurement system coupled to the sensor housing to track the tilt motion of the sensor housing with respect to the angular motion of the eccentric cam.

An aspect of the embodiments includes a system comprising a sensor assembly having a sensor housing to house sensor components which share a common line-of-sight and a dither system. The sensor housing includes a first side and a second side. The dither system comprises a support member comprising a first metal bellows being concentric with the first side of the sensor housing to constrain rotational motion of the first side of the sensor housing and allow angular motion and a second metal bellows being concentric with the second side of the sensor housing. The dither system includes a rotatable eccentric cam coupled to the second metal bellows and comprising an outer circumference which has an axis which is coaxial with an axis of the first metal bellows and an inner circumference including an axis which is laterally offset from the axis of the first bellow, the eccentric cam to drive tilt motion of the sensor housing and the LOS with respect to the support member. The dither system includes a position measurement system to track the tilt motion of the sensor housing with respect to the rotation of the eccentric cam.

Another aspect of the embodiments includes a method comprising rotationally constraining a sensor housing by a first metal bellows coupled to the support frame member, the sensor housing houses sensor components having a shared common line-of-sight; rotating an eccentric cam circumferentially surrounding a second bellows coupled to the support frame member; driving, by the eccentric cam, tilt motion of the sensor housing with respect to the support frame member; and tracking, by a position measurement system coupled to the sensor housing, axial motion and the tilt motion of the sensor housing with respect to angular motion of the eccentric cam.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
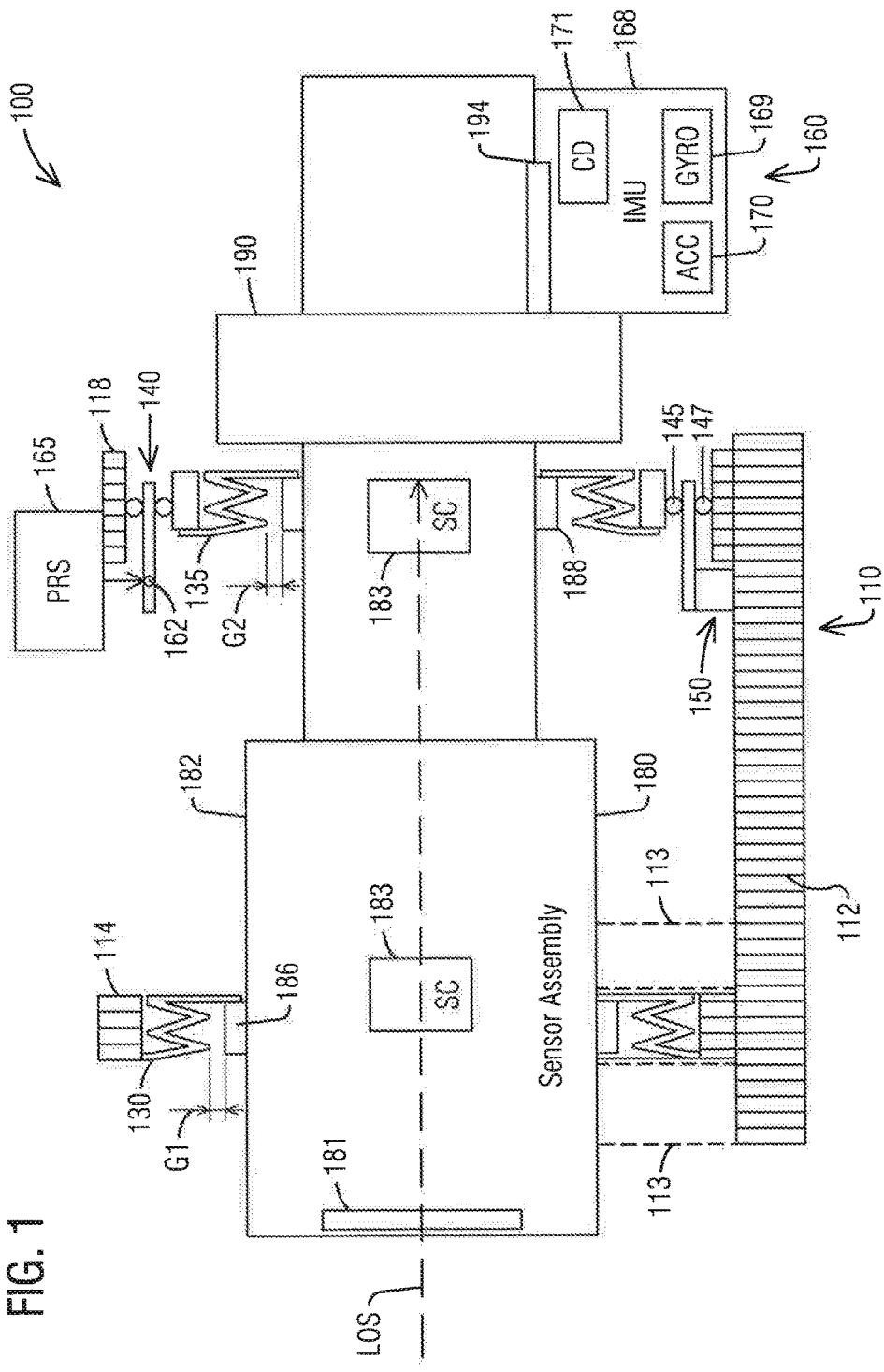
FIG. 1 illustrates a cross-sectional view of a dither system with a sensor assembly mounted thereto.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The terms right, left, upward, downward, front, back and side are only used as a frame of reference for describing components herein and are not to be limiting in any way.

In the embodiments, a dither system may be provided to dither an entire sensor assembly and position measuring system instead of just a portion of the sensor assembly to eliminate error sources in the line-of-sight (LOS) pointing and internal to the sensor alignments. By way of non-limiting example, the error sources may be due to moving only part of the sensor assembly relative to the rest of the sensor assembly and the position measuring system.

In some embodiments, the sensor assembly may include an imaging sensing assembly comprising an optical system and dewar with a focal plane array (FPA).

FIG. 1 illustrates a cross-sectional view of a dither system 100 with a sensor assembly 180 mounted thereto. The sensor assembly 180 may be an imaging sensor system, X-ray spectrometer, wave-front sensor or other devices with a shared common line-of-sight (LOS) which may be dithered. The sensor assembly 180 may comprise a sensor housing 182 housing therein the sensor components 183 which are arranged to have a shared common line-of-sight (LOS). The sensor components 183 may comprise lenses (i.e., lens 181), electromagnetic radiation sensors, X-ray sensors, focal plane arrays (FPAs), etc. The sensor housing 182 may comprise a first flange 186 surrounding the sensor housing 182. The sensor housing 182 may comprise a second flange 188 surrounding the sensor housing 182. The sensor housing 182 may comprise a mount structure 190.

Figure 2:
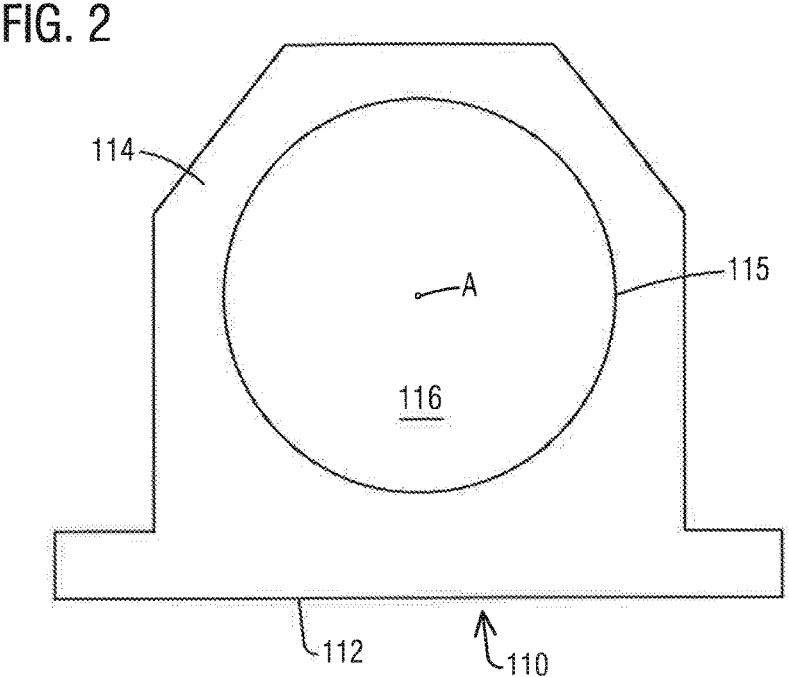
FIG. 2 illustrates an end view of a support frame member.

The system 100 may comprises a support frame member 110 having a base 112 and first upright wall 114 perpendicular to the base 112 and a second upright wall 118, perpendicular to the base 112. The support frame member 110 is hatched with straight lines. The first wall 114 has a through hole or opening 116 (FIG. 2). The second wall 118 having a through hole or opening 119 (FIG. 5) with a circumferential surface 121 (FIG. 5).

The system 100 may optionally include at least one longitudinal stop 113, denoted in dashed lines, mounted or integrated into the support frame member 110. The at least one longitudinal stop 113 may be positioned in proximity to opposing sides of the first upright wall 114 and below the sensor housing 182. For example, one of the longitudinal stops 113 may be in front of or leading the first upright wall 114 and a second longitudinal stop 113 may in back of or trailing the first upright wall 114. In some embodiments, the at least one longitudinal stop 113 may be coupled to the sensor housing 182.

The system 100 may further comprise a first metal bellows 130 and a second metal bellows 135. The first metal bellows 130 may be coupled to the support frame member 110 in the through hole or opening 116 (FIG. 2) which is concentric to the sensor housing 182 to constrain rotational motion of the sensor housing 182. The first metal bellows 130 may be attached to the first flange 186. In some embodiments, the first flange 186 may be part of the first metal bellows 130 instead of the sensor housing 182. However, the first flange 186 can be affixed circumferentially to the outer surface of the sensor housing 182.

Figure 5:
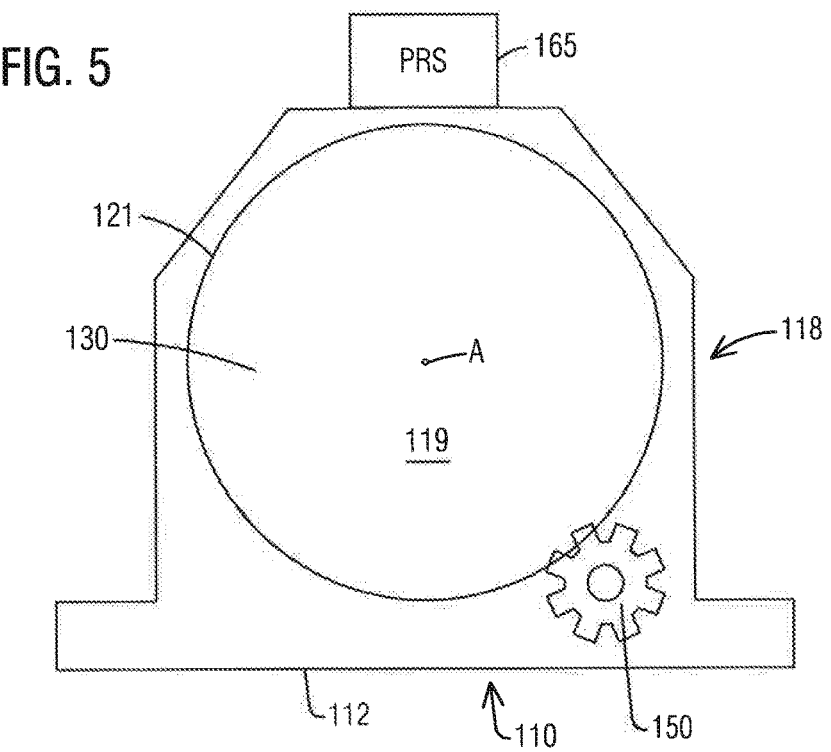
FIG. 5 illustrates a view of the second upright wall of the support frame member.

The second metal bellows 135 may be coupled to the support frame member 110 in the through hole or opening 119 (FIG. 5). The second metal bellows 135 may be concentric to the sensor housing 182 and may be attached to the second flange 188. The second metal bellows 135 being axially and laterally offset from the first metal bellows 130, as will be seen in FIG. 6. The second metal bellows 135 may be attached to the second flange 188. In some embodiments, the second flange 188 may be part of the second metal bellows 135 instead of the sensor housing 182. However, the second flange 188 can be affixed to the outer surface of the sensor housing 182. In some embodiment, the second flange 188 may be a housing sleeve or other housing segment which allows the second metal bellows 135 to be coupled to the sensor housing 182. Alternately, the flange 188 may be part of the second metal bellows 135 which is to be attached to the sensor housing 182.

The first bellows 130 is constructed to provide a gap G1 between the flange 186 and/or the sensor housing 182 so that the sensor housing 182 may flex about the first bellows 130 as the line-of-sight (LOS) common throughout the sensor housing 182 can be tilted and angularly adjusted. The first bellows 130 constrains the sensor housing 182 so that it does not rotate. Nonetheless, the sensor housing 182 is flexed in position within the clearance of the gap G1 circumferentially created between the sensor housing 182 and/or first flange 186 and the first bellows 130.

Likewise, the second bellows 135 is constructed to provide a gap G2 between the flange 188 and/or the sensor housing 182 so that the sensor housing 182 may flex about the second bellows 135 as the line-of-sight (LOS) common throughout the sensor housing 182 can be tilted and angularly adjusted. The sensor housing 182 is flexed in position within the clearance of the gap G2 circumferentially created between the sensor housing 182 and/or second flange 188 and the second bellows 135.

The system 100 may comprise an eccentric cam 140 circumferentially surrounding the second metal bellows 135 and having angular motion to drive tilt motion of the sensor housing 182 with respect to the support frame member 110. The eccentric cam 140 may be coupled to a first bearing 145 concentric to and surrounding the second bellows 135. The eccentric cam 140 may be coupled to a second bearing 147 surrounding an outer surface of the eccentric cam 140 and may be coupled to an interior surface of the through hole or opening 119 (FIG. 5) of the second wall 118. The system 100 may further comprise a cam drive system 150 coupled to the eccentric cam 140 to cause the eccentric cam 140 to rotate up to 360° in a repeatable manner. In other words, the eccentric cam 140 is rotated around a circle. The cam drive system 150 may comprise a motor (not shown) with a belt system, gear system, by way of example. The cam drive system may be a direct drive system. The first metal bellows 130 and a second metal bellows 135 with eccentric cam 140 may be interchanged wherein the eccentric cam may be moved to the front of the sensor assembly 180. The system 100 may include at least one eccentric cam 140 and at least one bearing 145 wherein each eccentric cam and bearing pair may be rotated at a different speed or different rate of angular motion to vary the tilt motion of the sensor assembly 180.

The system 100 may further comprise a position measurement system 160 to track the tilt motion of the sensor housing 182 with respect to the angular motion of the eccentric cam 140. The position measurement system 160 may comprising at least one marker 162 on the eccentric cam 140 to mark at least one predetermined location on the eccentric cam 140. In the illustration, only one mark is shown. However, more than one marker may be used to mark different positions (predetermined locations) on the circumference of the eccentric cam 140. The predetermined locations may mark the angular rotation or position of the eccentric cam 162 which can be repeated tracked during rotation of the eccentric cam 140. The position measurement system 160 may comprise a position rotational sensor (PRS) 165 coupled to the support frame member 110 in proximity to the eccentric cam 140 to sense a marker 162 corresponding to a predetermined eccentric cam angular position. By way of non-limiting example, the marker 162 may represent an initial starting point or home location, such as at 0° on the eccentric cam 140. The PRS 165 may be an optical detector. The eccentric cam 140 completes a rotation, such as after a 360° rotation, to return to the marker 162 representing the 0° location.

Figure 10:
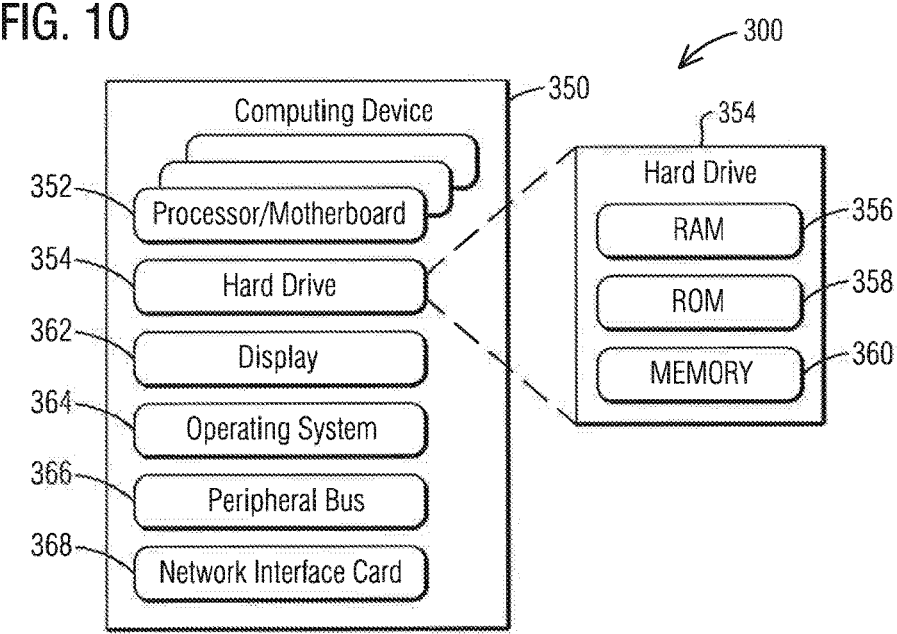
FIG. 10 illustrates a computing device.

The position measurement system 160 may include an inertial measurement unit (IMU) 168 which is directly coupled or mounted, via a mount 194, to the sensor housing 182. The IMU 168 may detect changes in tilt positions of the sensor housing 182 as the eccentric cam 140 rotates. The PRS 165 would communicate such position to the IMU 168 or to an external computing device 350 (FIG. 10). The IMU 168 may include a computing device (CD) 171 (i.e., computing device 350) which may be communicate wireless or wired to an external computing device 350 (FIG. 10). The IMU 168 may include at least one accelerometer (ACC) 170 and/or at least one gyroscope (GYRO) 169 to sense the tilt positions of the sensor housing 182. The computing device 171 of the IMU 168 may determine one or more of pitch, yaw and roll of the sensor housing 182 during the rotation of the eccentric cam 140 based on the acceleration by the at least one accelerometer (ACC) 170 and the inertial movements by the at least one gyroscope (GYRO) 169. The position measurements may be accomplished by the aforementioned direct IMU embodiment where the IMU 168 is mounted to the sensor assembly 180. Alternately, the IMU 168 may be mounted on the support frame 110 or any other fixed portion of the assembly. The position of the sensor assembly 180 relative to the IMU may be measured by an accurate encoder placed around the periphery of the cam 140. Positional measurements by direct measurement of the position of the sensor assembly 180 may be accomplished in two nominally orthogonal planes via an optical or other distance measurement method.

Figure 3:
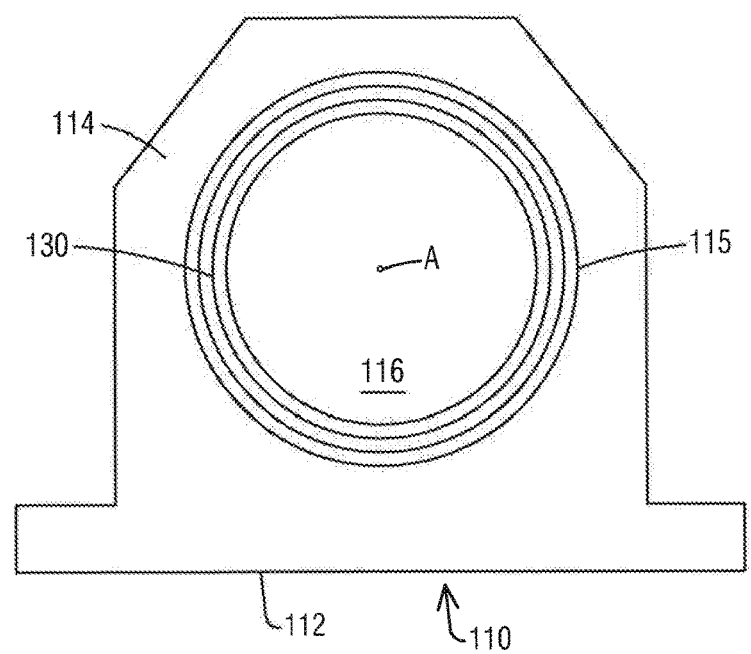
FIG. 3 illustrates the end view of the support frame member of FIG. 2 with a first metal bellows.

FIG. 2 illustrates an end view of a support frame member 110 shown. FIG. 3 illustrates the end view of the support frame member 110 with metal bellows 130 installed. The support frame member 110 may comprise a base 112 which may have a width wider than the first upright wall 114 depending perpendicularly from the base 112. In the first upright wall 114, the hole or opening 116 is formed therein. The hole or opening 116 has an interior circumferential surface 115. The center of the hole or opening 116 provides a center axis A. In some embodiments, the width of the first upright wall 114 is the same as the base 112. In others the base may have a wider width than the wall 114.

The metal bellows 130 may be mounted to the interior circumferential surface 115 of the hole or opening 116. The metal bellows 130 may be concentric to the circumferential surface 115, the center of which provides a center axis A.

Figure 4:
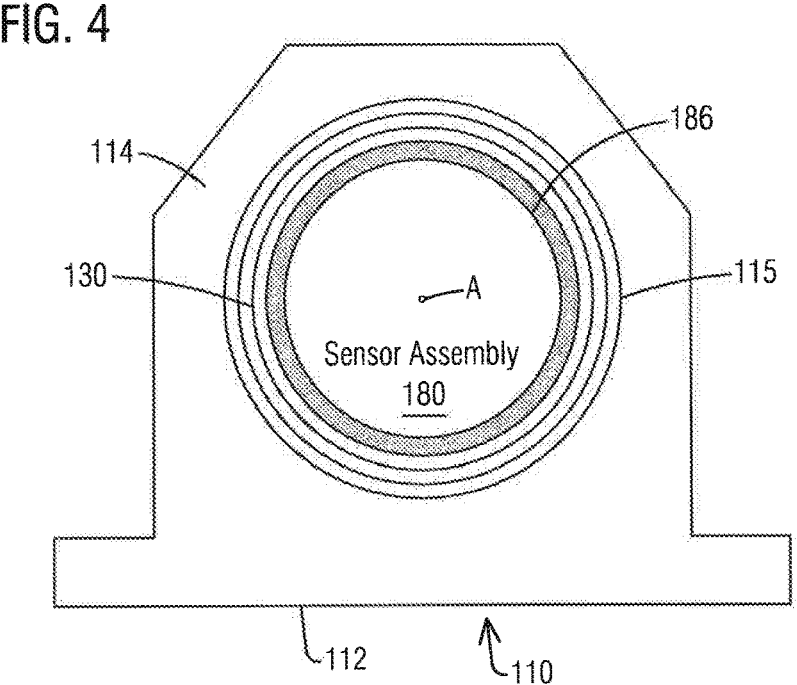
FIG. 4 illustrates an end view of the support frame member of FIG. 3 with a sensor assembly mounted within the first metal bellows.

Turning now to FIG. 4, the end view of the support frame member 110 of FIG. 3 with the sensor assembly 180 mounted within the metal bellows 130 is shown. The grayish colored ring represents the first flange 186 for illustrative purposes.

FIG. 5 illustrates a view of the second upright wall 118 of the support frame member 110, the second upright wall 118 being perpendicular to base 112. The PRS 165 may be mounted to a top of the second upright wall 1. However, the PRS 165 may located at different locations so as to detect marker 162. The center of the hole or opening 119 has a center axis A. The center axis of hole or opening 119 may the same as the center axis A formed in the first upright wall 114. The interior circumferential surface 121 bounds the hole or opening 119. The cam drive system 150 is coupled to the support frame member 110 either directly or indirectly. The cam drive system 150 is represented as a gear to be driven by a motor (not shown). However, the cam drive system 150 may include belts or direct drive systems. The placement of the cam drive system 150 may be varied. For example, the cam drive system 150 may attach the motor between the first and second walls 114 and 116, to the first upright wall 114, to the second wall and/or to the base 112.

Figure 6:
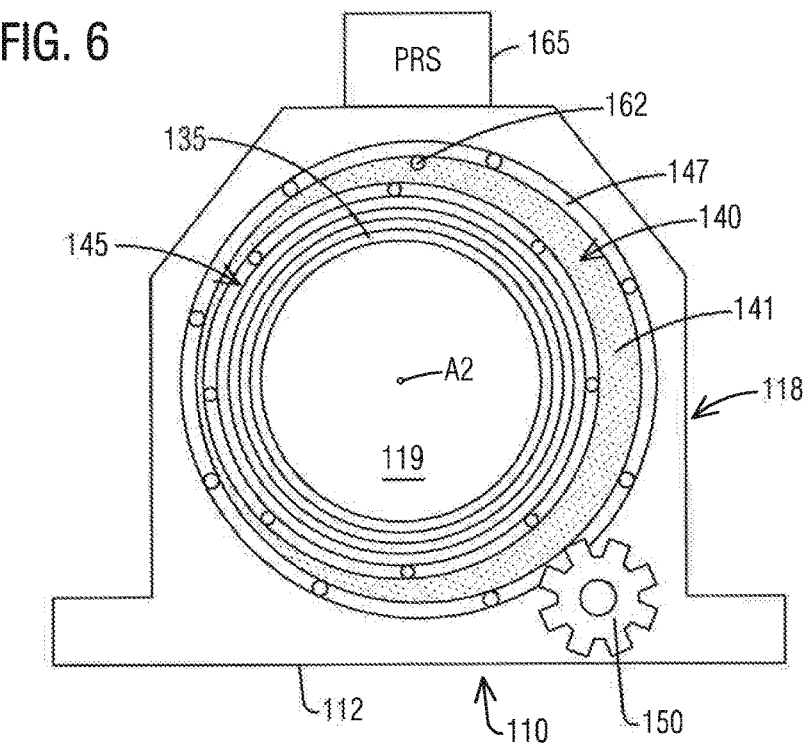
FIG. 6 illustrates the view of the second upright wall of FIG. 5 with a rotating eccentric cam and a second metal bellow.
Figure 7:
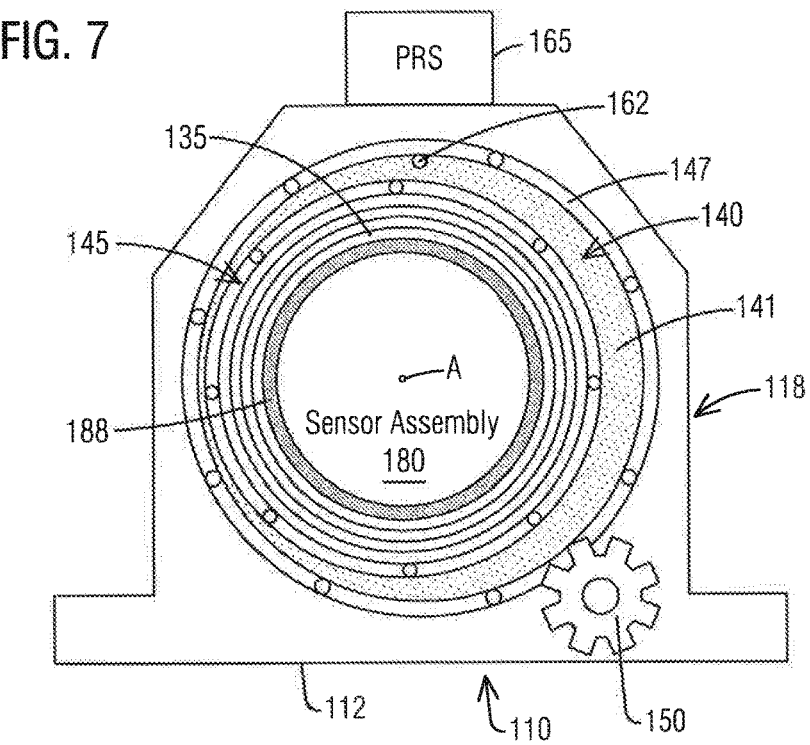
FIG. 7 illustrates the view of the second upright wall of FIG. 6 with the sensor assembly mounted within the second metal bellows.

FIG. 6 illustrates the view of the second upright wall of FIG. 5 with the rotating eccentric cam 140 and metal bellow 135. However, FIG. 7 illustrates the view of the second upright wall 118 of FIG. 6 with the sensor assembly 180 mounted within the second metal bellows 135 via the second flange 188, for example. The eccentric cam 140 is coupled to a first bearing 145 concentric to and surrounding the second bellows 135. The eccentric cam 140 is coupled to a second bearing 147 surrounding an outer surface of the eccentric cam 140 and coupled to an interior surface 121 of the through hole or opening 119 of the second wall 118. The eccentric cam 140 is flanked by the first bearing 145 and the second bearing 147 to allow the cam 140 to rotate around the interior surface 121.

As shown in FIG. 6, the center axis A2 of the eccentric cam 140 is offset from the center axis A. The eccentric cam 140 may include a cam ring 141 having a circumference. The width of the cam ring 141 (denoted in as dotted area) varies such that a width of the ring 141 becomes narrower along a predetermined arc along the circumference of the ring. Thus, the center axis A2 is offset from the center axis A of the hole or opening 119. This offsets the common line-of-sight (LOS) in the sensor housing 182 with respect to center axis A.

The cam drive system 150 may be coupled to the eccentric cam 140 to cause the eccentric cam 140 to rotate up to 360° in a repeatable manner around the circumference of the second bearing 147. In other words, the eccentric cam 140 may be rotated around a circle or portion thereof.

The drive system 150 to cause angular motion of the eccentric cam 140. The angular motion of the eccentric cam 140 is repeatable. The tilt motion of the sensor assembly 180, as it wobbles during angular motion of the eccentric cam 140, is a function of the eccentric cam angular position sensed by the PRS 165 and the inertial measurement of the sensor housing 182 as measured by the IMU 168 (FIG. 1).

In operation, the sensor assembly 180 wobbles in position wherein the front end (first side) of the sensor assembly 180 is constrained or flexed in place by the first bellows 130 such that the sensor assembly 180 does not rotate. The back-end (second side) of the sensor assembly 180 supported by the second bellows 135 wobbles during rotation of the eccentric cam 140.

In view of the foregoing, embodiments herein utilize a set of bellows 130 and 135 that allow tilt motion, but constrains the planar motion of the sensor housing 182 in each bellows. The embodiments may allow an eccentric cam 140 located concentric to the second bellows 135 to drive angular motion into the sensor assembly 180. The eccentric cam 140 maintains repeatable angular motion over temperature and wear. The IMU 168 on the sensor assembly 180 accurately tracks the inertial motion over temperature and mechanical wear by alignment calibration. The position rotational sensor (PRS) 165 to provide information to the IMU 168 to maintain IMU alignment with respect to the marker 162 of the eccentric cam 140. Thus, as temperature varies and/or wear happens, the IMU 168 may continually, periodically or some other increment of time, calibrate its alignment with the repeated detections by the PRS 165.

In some embodiments, the IMU may be substituted with a position resolver or other positional measurement device providing direct measurement of the position of the sensor assembly 180 in two nominally orthogonal axes via an optical or other distance measurement method to track the rotational position of the eccentric cam and/or sensor assembly with a look-up table (LUT). The resolver may include a computing device with a LUT in onboard memory. Alternately, the resolver may communicate wired or wirelessly with an external computer device which may include the LUT. The inventor have solved the problem of maintaining alignment and tracking between the dither mechanism, sensor assembly, and the line-of-sight (LOS) by mounting either an IMU on the sensor housing 182 or a resolver on the sensor housing 182 to track the rotational position. In generally, all sensor components which share the common LOS are housed in the sensor housing 182 and may be subject to axial and lateral motion in unison.

Figure 8:
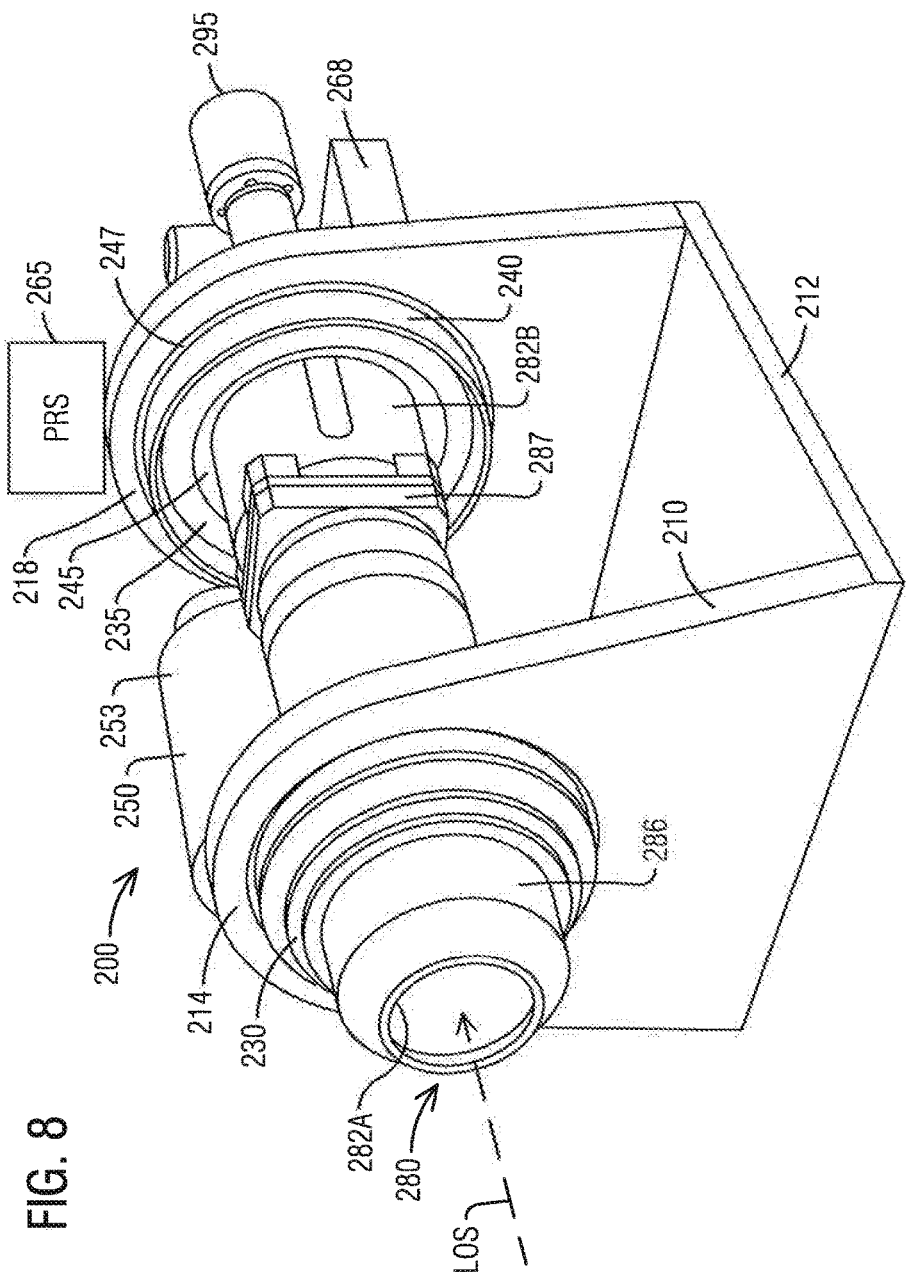
FIG. 8 illustrates a perspective view of the dither system with a mounted imaging sensor assembly.
Figure 9:
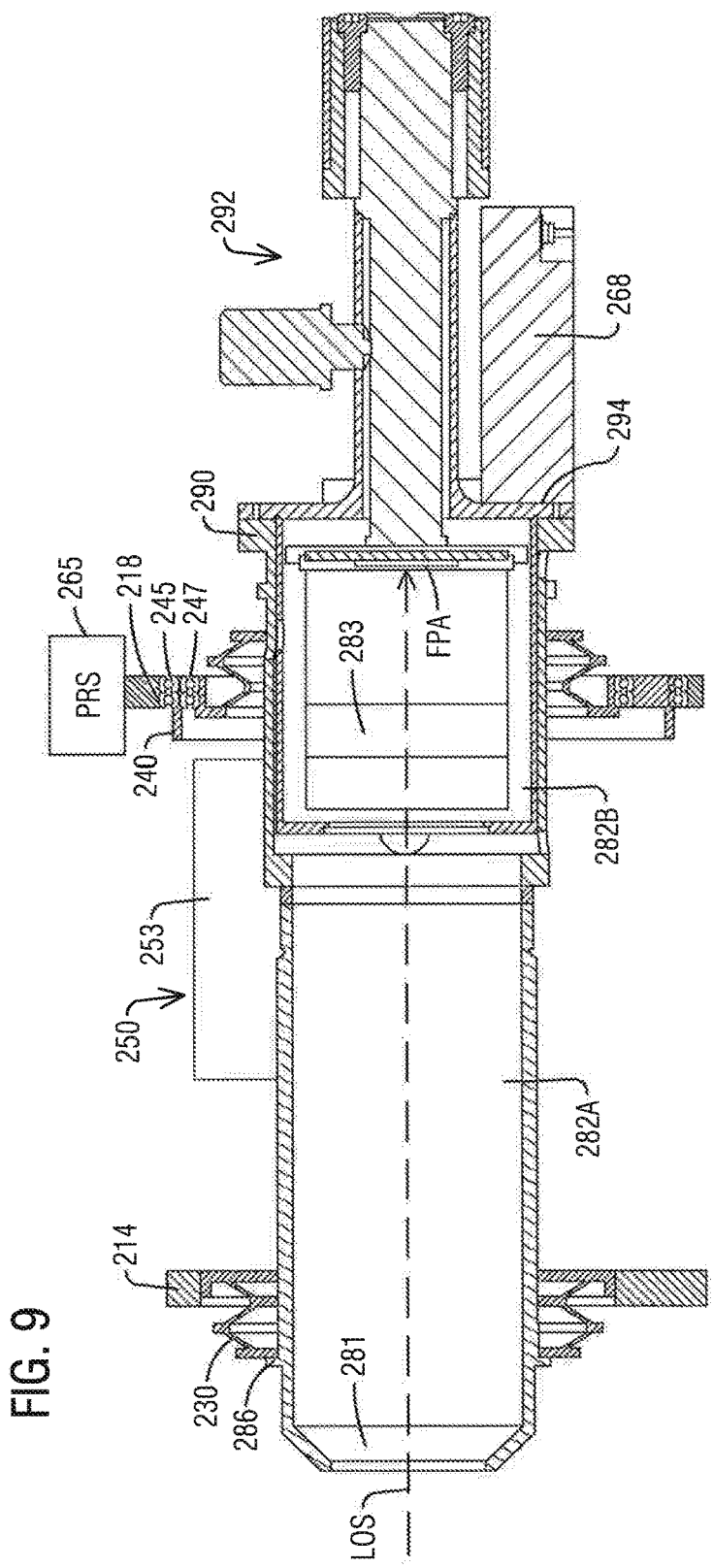
FIG. 9 illustrates a cross-sectional view of the dither system with the mounted imaging sensor assembly of FIG. 8.

FIG. 8 illustrates a perspective view of the dither system 200 with a mounted imaging sensor assembly 280. FIG. 9 illustrates a cross-sectional view of the dither system 200 with the mounted imaging sensor assembly 280 of FIG. 8. The dither system 200 is similar to system 100. Thus, the differences will be described.

The sensor assembly 280 may be an imaging sensor system. The sensor assembly 280 may comprise a first sensor housing section 282A housing therein optical lens 281 and other sensor components of the imaging sensor system. The sensor assembly 280 may include a second sensor housing section 282B which may include a dewar 283 with a focal plane array (FPA). By way of non-limiting example, the first second housing section 282A and the second sensor housing section 282B are rigidly affixed together by coupling flanges 287 which allow the housing sections 282A and 282B to be bolted, welded, or adhesively attached together. In some embodiment, the housing sections 282A and 282B may be a unitary housing without the need to rigidly affixed sections.

In some embodiments, the sensor assembly and optical lens components may have no moving parts. The shared common LOS of the optical lens components being moved as function of the dithering actions described herein. By way of non-limiting example, some infrared imaging system may include a rotating wedge or plate. The embodiments herein may eliminate the need for a rotating wedge or plate in the optical path used by other dithering mechanisms.

The first sensor housing section 282A may comprise a first flange 286 surrounding the first sensor housing section 282A. The second sensor housing section 282B may comprise a second flange 288 surrounding the second sensor housing section 282B. As best seen in FIG. 9, the second sensor housing section 282B may comprise a mount structure 290 with mount 294 to couple the IMU 268 to the second sensor housing section 282B.

The system 200 may comprises a support frame member 210 having a base 212 and first upright wall 214 perpendicular to the base 212 and a second upright wall 218, perpendicular to the base 212, the first wall 214 and second wall 218 are laterally offset. In some embodiments, the first wall 214 and second wall 218 may have a common axis or the axes may be offset with respect to the other. The system 200 may further comprise a first metal bellows 230 and a second metal bellows 235. The first metal bellows 230 may be attached to the first flange 286. The second metal bellows 235 may be concentric to the second sensor housing section 282B. The second metal bellows 235 may be attached to the second flange 288 or second sensor housing section 282B. The second metal bellows 235 being axially and laterally offset from the first metal bellows 230. The second metal bellows 235 may be attached to the second flange 288.

The system 200 may comprise an eccentric cam 240 circumferentially surrounding the second metal bellows 235 and having angular motion to drive tilt motion of the second sensor housing section 282B with respect to the support frame member 210. The eccentric cam 240 is coupled to a first bearing 245 concentric to and surrounding the second bellows 235. The eccentric cam 240 is coupled to a second bearing 247 surrounding an outer surface of the eccentric cam 240. The system 200 may further comprise a cam drive system 250 coupled to the eccentric cam 240 to cause the eccentric cam 240 to rotate up to 360° in a repeatable manner. The cam drive system 250 may comprise a motor 253 with a belt system, gear system, by way of example. The cam drive system 250 may be a direct drive system. The position rotational sensor (PRS) 265 may be coupled to the support frame member 210 in proximity to the eccentric cam 240 to sense a marker (i.e., marker 162) corresponding to a predetermined eccentric cam angular position. In some embodiments, the PRS 265 may be separate from the frame member 210. The IMU 268 may be coupled or mounted, via a mount 294, to the second sensor housing section 282B. In some embodiments, the second sensor housing section 282B may include a cold finger of an integrated detector cooling assembly (IDCA) 292 coupled to the dewar 283.

The embodiments described herein have no moving parts in the optics train to align or measure any drift for misalignment over temperature and wear. The embodiments may provide direct measurement of the LOS via an IMU. The embodiments herein may eliminate optical distortion mapping errors compared to rotating lens systems, such as due to mechanical alignment and/or movement under temperature variation and mechanical wear.

The dither systems 100 or 200 may be used in an infrared staring system to improve resolution. For example, in lieu of rotating an optical wedge or plate in the optical path, the entire sensor assembly is rotated in unison.

FIG. 10 illustrates a computing device 350. The computing device 350 may include one or more processors 352 and system memory in hard drive 354. Depending on the exact configuration and type of computing device, system memory may be volatile (such as RAM 356), non-volatile (such as read only memory (ROM 358), flash memory 360, and the like) or some combination thereof. System memory may store operating system 364, one or more applications, and may include program data for performing image processing, inertial measurements for the tilt motions, and alignment calculations. The computing device 350 may carry out one or more image processing algorithms known in the art.

Computing device 350 may also have additional features or functionality. For example, computing device 350 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage, and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 350 may also include or have interfaces for input device(s) (not shown) such as a keyboard, mouse, pen, voice input device, touch input device, etc. The computing device 350 may include or have interfaces for connection to output device(s) such as a display 362, speakers, etc. The computing device 350 may include a peripheral bus 366 for connecting to peripherals. Computing device 350 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 350 may include a network interface card 368 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

Figure 11:
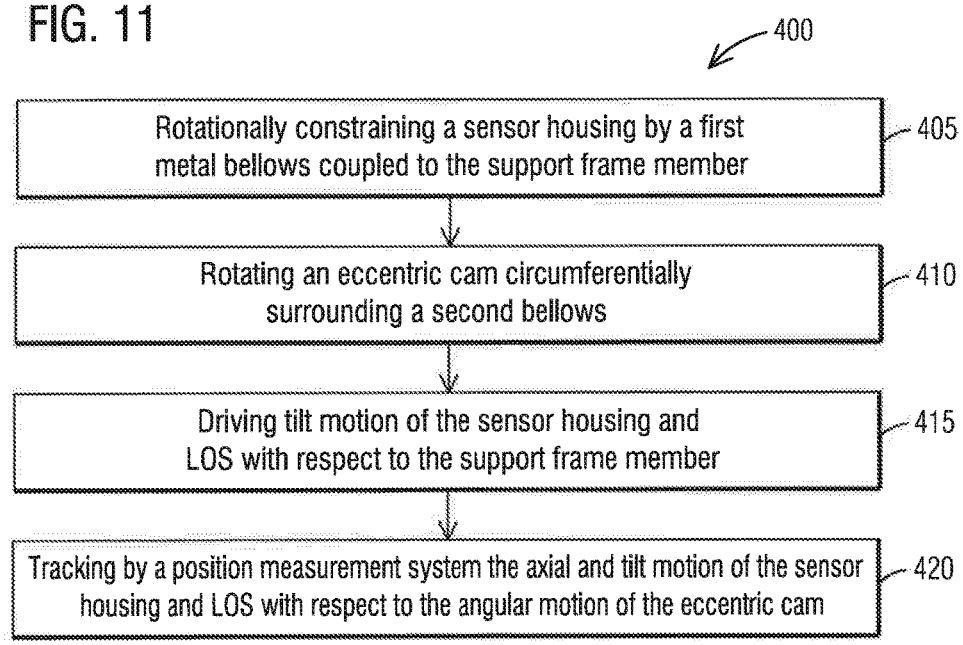
FIG. 11 illustrates a method of dithering a sensor assembly.

FIG. 11 illustrates a method 400 of dithering a sensor assembly. The method comprises a method comprising, at block 405, rotationally constraining a sensor housing by a first metal bellows coupled to the support frame member. At block 410, the method includes rotating an eccentric cam circumferentially surrounding a second bellows coupled to the support frame member. At block 415, the method includes driving tilt motion of the sensor housing with respect to the support frame member. At block 420, the method includes tracking by a position measurement system the axial and tilt motion of the sensor housing with respect to the angular motion of the eccentric cam.

The tracking by the position measurement system may comprises sensing by a position rotational sensor of the position measurement system, a marker on the eccentric cam, the marker corresponding to a predetermined eccentric cam angular position; and performing inertial measurement by an inertial measurement unit (IMU) coupled to the sensor housing, to detect changes in axial and tilt positions as the eccentric cam rotates.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

I claim:

1. A system comprising:
    a support member to support a sensor housing having a common line-of-sight (LOS) therethrough;
    a first metal bellows coupled to the support member and being concentric to the sensor housing to constrain rotational motion of the sensor housing and allow angular motion;
    an eccentric cam comprising an outer circumference which has an axis which is coaxial with an axis of the first metal bellows and an inner circumference including an axis which is laterally offset from the axis of the first bellow, the eccentric cam to drive tilt motion of the sensor housing and the LOS;
    a second metal bellows coaxial to the inner circumference of the eccentric cam and being concentric to the sensor housing; and
    a position measurement system coupled to the sensor housing to track axial motion and the tilt motion of the sensor housing with respect to angular motion of the eccentric cam.

2. The system according to claim 1, wherein the position measurement system comprising:
    at least one marker on the eccentric cam to mark at least one predetermined location on the eccentric cam;
    a position rotational sensor coupled to the support member in proximity to the eccentric cam to sense a marker corresponding to a predetermined eccentric cam angular position; and
    an inertial measurement unit (IMU) coupled to the sensor housing, the IMU to detect changes in axial and tilt positions as the eccentric cam rotates.

3. The system according to claim 2, further comprising a drive assembly coupled to the eccentric cam, the drive assembly to cause the angular motion of the eccentric cam.

4. The system according to claim 2, wherein the angular motion of the eccentric cam is repeatable.

5. The system according to claim 2, wherein the tilt motion is a function of the sensed predetermined eccentric cam angular position and the inertial measurement of the sensor housing by the IMU.

6. The system according to claim 1, wherein the support member comprises a bracket having a first wall having a through hole to support the first bellows within the through hole and a second wall having a through hole; and further comprising:
    a first bearing concentric to and surrounding the second bellows; and
    a second bearing surrounding an outer surface of the eccentric cam and coupled to an interior surface of the through hole of the second wall.

7. The system according to claim 6, further comprising:
    a sensor assembly comprising the sensor housing to house sensor components, the sensor housing comprising:
        a first flange surrounding the sensor housing and coupled to the first bellows;
        a second flange surrounding the sensor housing and coupled to the second bellows; and
        a mount for coupling the IMU to the sensor housing.

8. A system comprising:
    a sensor assembly having a sensor housing to house sensor components having a shared line-of-sight (LOS), the sensor housing having a first side and a second side; and
    a dither system comprising:
        a support member comprising: a first metal bellows being concentric with the first side of the sensor housing to constrain rotational motion of the first side of the sensor housing and allow angular motion and a second metal bellows being concentric with the second side of the sensor housing;
        a rotatable eccentric cam coupled to the second metal bellows and comprising an outer circumference which has an axis which is coaxial with an axis of the first metal bellows and an inner circumference including an axis which is laterally offset from the axis of the first bellows, the eccentric cam to drive tilt motion of the sensor housing and the LOS with respect to the support member; and
        a position measurement system to track the tilt motion of the sensor housing with respect to the rotation of the eccentric cam.

9. The system according to claim 8, wherein the position measurement system comprising:
    at least one marker on the eccentric cam to mark at least one predetermined location on the eccentric cam;
    a position rotational sensor coupled to the support member in proximity to the eccentric cam to sense a marker corresponding to a predetermined eccentric cam angular position; and
    an inertial measurement unit (IMU) coupled to the sensor housing, the IMU to detect changes in tilt positions as the eccentric cam rotates.

10. The system according to claim 9, further comprising a drive assembly coupled to the eccentric cam, the drive assembly to cause angular motion of the eccentric cam.

11. The system according to claim 10, wherein the angular motion is repeatable.

12. The system according to claim 9, wherein the tilt motion is a function of the sensed predetermined eccentric cam angular position and the inertial measurement of the sensor housing by the IMU.

13. The system according to claim 8, wherein the support member comprises a bracket having a first wall having a through hole to support the first bellows within the through hole and a second wall having a through hole; and further comprising:

a first bearing concentric to and surrounding the second bellows; and a second bearing surrounding an outer surface of the eccentric cam and coupled to an interior surface of the through hole of the second wall.

14. The system according to claim 13, wherein the sensor housing comprising:

a first flange surrounding the sensor housing and coupled to the first bellows;

a second flange surrounding the sensor housing and coupled to the second bellows; and a mount for coupling the IMU to the sensor housing.

15. The system according to claim 8, wherein the sensor housing comprises an optical assembly and an integrated detector cooling assembly.

16. A method comprising:

rotationally constraining a sensor housing by a first metal bellows coupled to a support frame member, the sensor housing houses sensor components having a shared common line-of-sight (LOS);

rotating an eccentric cam circumferentially surrounding a second bellows coupled to the support frame member;

driving, by the eccentric cam, tilt motion of the sensor housing with respect to the support frame member; and tracking by a position measurement system axial motion and the tilt motion of the sensor housing and LOS with respect to angular motion of the eccentric cam.

17. The method of claim 16, wherein the tracking by the position measurement system comprising:

sensing by a position rotational sensor of the position measurement system, a marker on the eccentric cam, the marker corresponding to a predetermined eccentric cam angular position; and performing inertial measurement by an inertial measurement unit (IMU) coupled to the sensor housing, to detect changes in axial and tilt positions as the eccentric cam rotates.

18. The method according to claim 17, wherein the tilt motion is a function of the sensed predetermined eccentric cam angular position and the inertial measurement of the sensor housing by the IMU.

19. The method according to claim 16, further comprising sensing infrared electromagnetic radiation by the sensor assembly, wherein the tracking by the position measurement system includes tracking dithering of the sensor assembly to improve image resolution of an image sensed.

20. The method according to claim 16, wherein the sensor housing comprises an optical assembly and an integrated detector cooling assembly.

* * * * *